United States Patent
Samra

(10) Patent No.: US 6,412,063 B1
(45) Date of Patent: *Jun. 25, 2002

(54) MULTIPLE-OPERAND INSTRUCTION IN A TWO OPERAND PIPELINE AND PROCESSOR EMPLOYING THE SAME

(75) Inventor: Nicholas G. Samra, Plano, TX (US)

(73) Assignee: VIA-Cyrix, Inc., Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,204

(22) Filed: Apr. 2, 1999

(51) Int. Cl.[7] .................................................. G06F 9/30
(52) U.S. Cl. ........................................ 712/210; 712/226
(58) Field of Search ................................ 712/200, 210, 712/211, 212, 216, 217, 47, 226

(56) References Cited

U.S. PATENT DOCUMENTS

| 5,553,256 A | * | 9/1996 | Fetterman | 712/217 |
|---|---|---|---|---|
| 5,649,138 A | * | 7/1997 | Ireton | 712/217 |
| 5,777,918 A | * | 7/1998 | Chan et al. | 708/709 |
| 5,974,523 A | * | 10/1999 | Glew et al. | 712/23 |
| 5,974,538 A | * | 10/1999 | Wilmot, II | 712/218 |
| 6,092,094 A | * | 7/2000 | Ireton | 708/706 |
| 6,199,152 B1 | * | 3/2001 | Kelly et al. | 711/207 |
| 6,219,779 B1 | * | 4/2001 | Takayama et al. | 712/210 |

* cited by examiner

Primary Examiner—John A. Follansbee
(74) Attorney, Agent, or Firm—Carr & Ferrell LLP

(57) ABSTRACT

For use in a processor having a pipeline of insufficient width to convey all operands of a given multiple-operand instruction concurrently, a system for, and method of, processing the multiple-operand instruction. In one embodiment, the system includes: (1) node creation circuitry that creates at least first and second nodes for the multiple-operand instruction, the first node being empty and containing at least one of the operands and (2) node transmission circuitry, coupled to the node creation circuitry, that transmits the first and second nodes sequentially through the pipeline. All the operands are subsequently concurrently available within an execution stage of the pipeline for execution of the multiple-operand instruction.

20 Claims, 4 Drawing Sheets

MULTIPLE-OPERAND INSTRUCTION IN A TWO OPERAND PIPELINE AND PROCESSOR EMPLOYING THE SAME

TECHNICAL FIELD OF THE INVENTION

The present invention is directed, in general, to processors and, more specifically, to a system and method for executing a three-operand instruction within the confines of a two-operand pipeline and a processor employing the same.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, the processor clock rate may not increase beyond a threshold physical speed at which signals may traverse the processor. Simply stated, a practical maximum exists to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The speed at which a processor can perform a desired task is also a function of the number of instructions required to code the task. A processor may require one or many clock cycles to execute a particular instruction. Thus, in order to enhance the speed at which a processor can perform a desired task, both the number of instructions used to code the task as well as the number of clock cycles required to execute each instruction should be minimized.

Statistically, certain instructions are executed more frequently than others. If the design of a processor is optimized to rapidly process the instructions which occur most frequently, then the overall throughput of the processor can be increased. Unfortunately, the optimization of a processor for certain frequent instructions is usually obtained only at the expense of other less frequent instructions, or requires additional circuitry, which increases the size of the processor.

One area in which less frequent instructions have dictated a compromise in design is in the area of multiple-operand processing. For each operand of an instruction, a portion of a bus must be used to pass the operand from a reservation station to an execution unit. For example, in 32 bit microprocessor architectures that have three operand instructions, the microprocessor uses three 32 bit buses to pass the instruction's three operands from the reservation station to the execution unit. The most common instructions that contain three or more operands are the multiply and the divide instructions.

Microprocessors use multiple operand buses to reduce the time required to process these less frequent instructions. However, the additional circuitry required to implement theses additional buses increase the size of the processor and increase the processor's power usage. Therefore, what is needed in the art is a way to process multiple-operand instructions without the cost of additional operand buses.

SUMMARY OF THE INVENTION

To address the above-discussed deficiencies of the prior art, it is a primary object of the present invention to provide a way to execute instructions that have more operands than the pipeline can convey in parallel.

In the attainment of the above primary object, the present invention provides, for use in a processor having a pipeline of insufficient width to convey all operands of a given multiple-operand instruction concurrently, a system for, and method of, processing the multiple-operand instruction. In one embodiment, the system includes: (1) node creation circuitry that creates at least first and second nodes for the multiple-operand instruction, the first node being empty and containing at least one of the operands and (2) node transmission circuitry, coupled to the node creation circuitry, that transmits the first and second nodes sequentially through the pipeline. All the operands are subsequently concurrently available within an execution stage of the pipeline for execution of the multiple-operand instruction.

The present invention introduces the broad concept of employing empty nodes (nodes that the execution unit ignores and therefore does not execute) to convey one or more of the operands of a multi-operand instruction. This allows the bus within the pipeline to convey more operands for a given instruction than could be otherwise conveyed were all the operands to be conveyed with the instruction itself.

In one embodiment of the present invention, the pipeline has a width sufficient to convey two operands. However, the broad scope of the present invention contemplates pipelines capable of conveying one or more operands in parallel.

In one embodiment of the present invention, the multiple-operand instruction is a three-operand instruction. Those skilled in the pertinent art will understand, however, that the present invention broadly applies to instructions having two or more operands, as long as the pipeline is narrower than the number of operands.

In one embodiment of the present invention, the node transmission circuitry is contained within a reservation station associated with the pipeline. In an embodiment to be illustrated and described, the processor contains three pipelines and three corresponding reservation stations. Each of the reservation stations has node creation circuitry and node transmission circuitry.

In one embodiment of the present invention, the node transmission circuitry transmits the first node before the second node. The execution unit holds the operand(s) transmitted with the first node until the second node is received and executed. Alternatively, the transmission circuitry transmits the second node before the first node, in which case the execution unit holds the operand(s) transmitted with the second node until the first node is received and executed.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

1. Integrated Processor System

Figure 1:
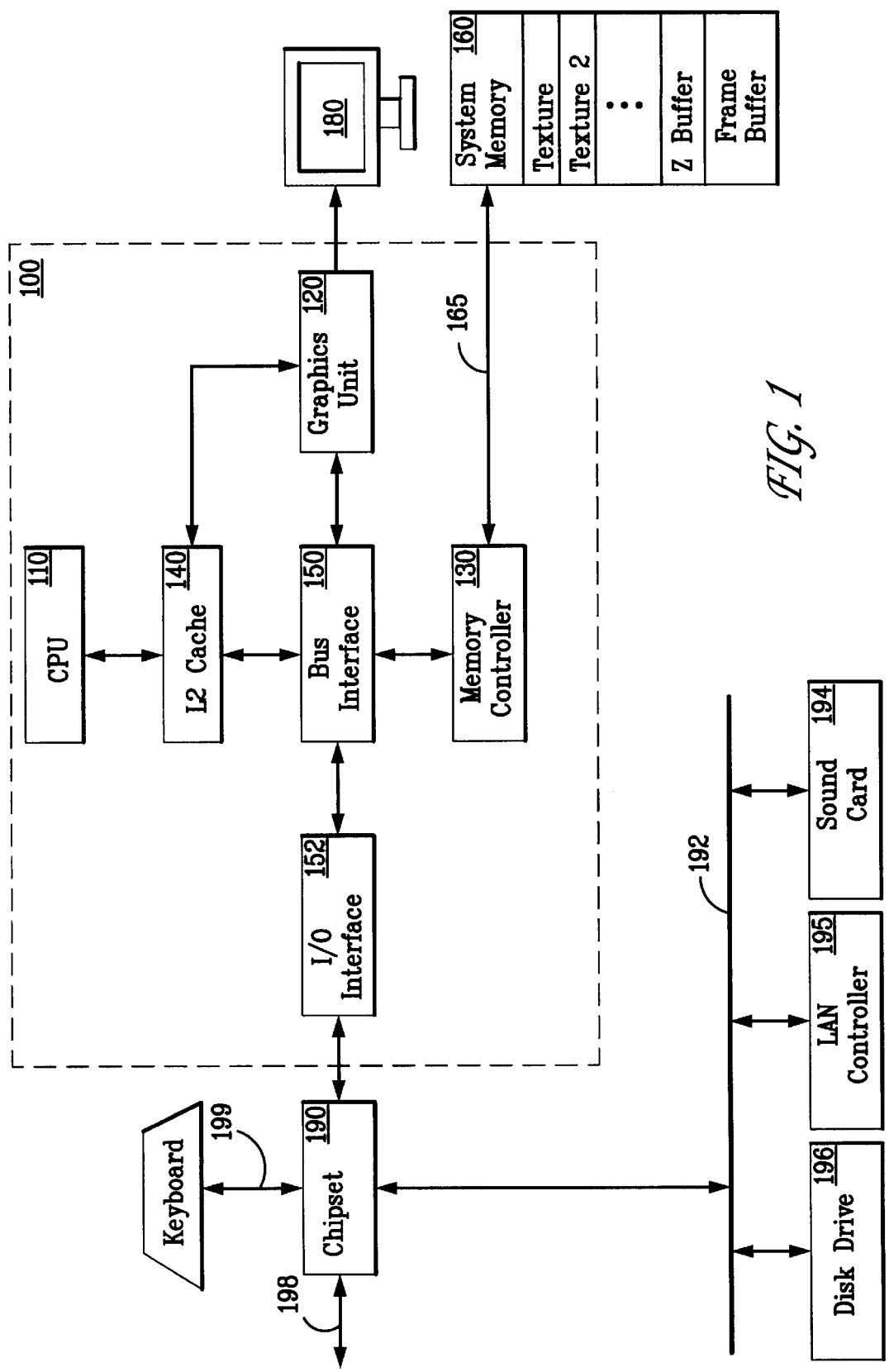
FIG. 1 illustrates an exemplary integrated processor system including an exemplary integrated microprocessor.

Referring initially to FIG. 1, illustrated is an exemplary integrated processor system, including an integrated microprocessor 100. The integrated microprocessor, includes a CPU 110 with dual integer and dual floating point execution units, separate load/store and branch units, and L1 instruction and data caches. Integrated onto the microprocessor die is a graphics unit 120, a system memory controller 130, an L2 cache 140 shared by the CPU and the graphics unit. A bus interface unit 150 interfaces the CPU, graphics unit and L2 cache to the memory controller.

The integrated memory controller 130 bridges the processor 100 to system memory 160, and may provide data compression/decompression to reduce bus traffic over the external memory bus 165 which preferably, although not exclusively, has a RAMbus™, fast SDRAM or other type protocol. The integrated graphics unit 120 provides TFT, DSTN, RGB or other type of video output to drive display 180.

The bus interface unit 150 interfaces, through an I/O interface 152, the processor 100 to a chipset bridge 190 for a conventional peripheral bus 192 (e.g., PCI) connection to peripherals such as sound card 194, LAN controller 195, disk drive 196 as well as a fast serial link 198 (e.g., IEEE 1394 "firewire"bus and/or universal serial bus "USB") and a relatively slow I/O port 199 for peripherals such as keyboard and mouse. Alternatively, chipset bridge 190 may integrate local bus functions such as sound, disk drive control, modem, network adapter, etc.

2. Integrated CPU

Figure 2:
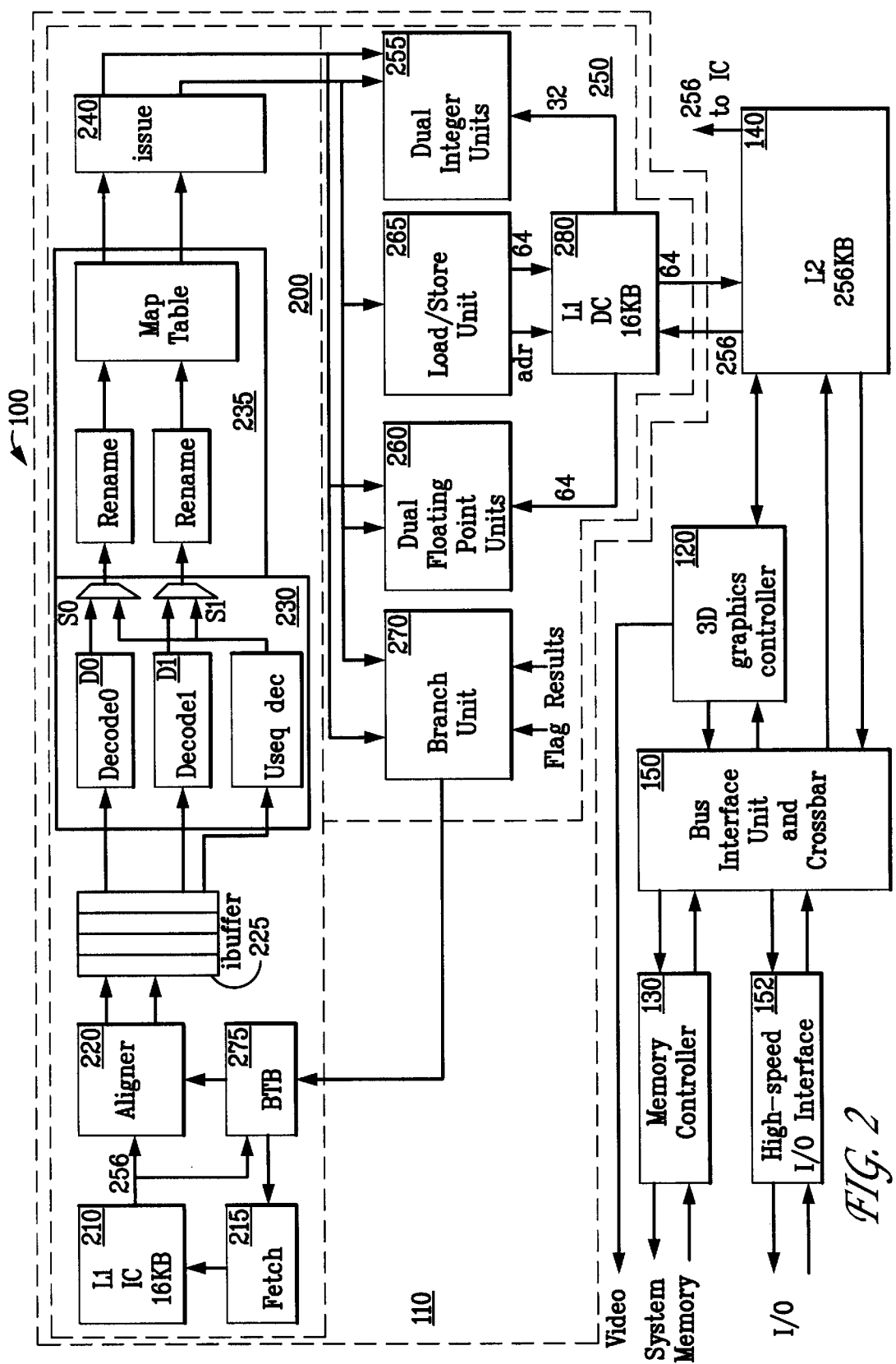
FIG. 2 illustrates, in more detail, the exemplary integrated microprocessor of FIG. 1.

FIG. 2 illustrates in more detail the exemplary integrated microprocessor 100, including CPU 110 integrated with graphics controller 120, memory controller 130, and L2 unified cache 140 (256 KB). CPU 110 includes an execution pipeline with instruction decode/dispatch logic 200 and functional units 250.

Instruction decode/dispatch logic 200 decodes variable length x86 instructions into nodes (operations) each containing source, destination, and control—each instruction maps into 1, 2, or more nodes, which are formed into checkpoints for issue in parallel to the functional units 250. The exemplary execution pipeline includes two integer units (EX) 255, two pipelined floating point units (FP) 260, a single load/store unit (LDST) 265, and a branch unit (BR) 270, so a single checkpoint can include up to 2 EX, 2 FP, 1 LDST, and 1 BR nodes which can be issued in parallel. An L1 data cache 280 (16 KB) receives data requests from the LDST unit, and in the case of an L1 hit supplies the requested data to appropriate EX or FP unit.

The BR unit 270 executes branch operations based on flag results from the EX units 255—predicted (taken/not-taken) and not-predicted (undetected) branches are resolved (mispredicts incur a 12 clock penalty), and branch information supplied to a BTB 275, including branch address, target address, and resolution (taken or not taken). The BTB includes a 1 KB target cache, a 7-bit history and prediction ROM, and a 16 entry return stack.

Instruction decode/dispatch logic 200 includes an L1 instruction cache 210 (16 KB) storing 32-byte cache lines (8 dwords/4 qwords). Each fetch operation, a fetch unit 215 fetches a cache line of 32 instruction bytes from the L1 instruction cache to aligner logic 220. The fetch unit 215 either (a) generates a fetch addresses by incrementing the previous fetch address (sequential fetch), or if the previous fetch address hit in the BTB 275, (b) switches the code stream by supplying the fetch address for the cache line containing the target address provided by the BTB. The fetch unit supplies a linear address simultaneously to the L1 instruction cache 210 and the BTB 275—a two level TLB structure (a 32 entry L1 instruction TLB and a 256 entry shared L2 TLB) supplies a corresponding physical address to the L1 cache to complete cache access.

Aligner logic 220 identifies up to two x86 variable length instructions per clock—instructions are buffered in an instruction buffer 225, along with decode and issue constraints. Decoder 230 transfers instructions from the instruction buffer to the appropriate one (as determined by decode constraints stored with the instruction) of decoders D0, D1, and Useq (a microsequencer)—D0 and D1 define two decode slots (or paths) S0 and S1, with the Useq decoder feeding nodes into both slots simultaneously.

D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to D0. The Useq decoder handles instructions that decode into more than two nodes/operations (e.g., far calls/returns, irets, segment register loads, floating point divides, floating point transcendentals)—each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint—up to 16 checkpoints may be active (i.e., issued to functional units).

Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support MMX™ and 3Dnow™, as well as standard x87 floating point, instruction execution—FPU0 includes a pipelined FAdder and FPU1 includes a pipelined Fmultipler, both supporting packed SIMD operations.

Integer multiply operations are issued to FPU1 with the Fmultiplier, and integer divide operations are issued as separate nodes to both FPU0 and FPU1, so that integer EX operations can execute in parallel with integer multiplies and divides. Results are forwarded between EX0/EX1 and FPU0/FPU1 in a single cycle.

The single LDST unit 265 executes memory reference operations as loads/stores to/from the data cache 280 (or L2 cache 140). The LDST unit performs pipelined linear address calculation and physical (paged) address translation, followed by data cache access with the physical (translated) address. Address translations are performed in order using a two level TLB structure (a 32 entry L1 data TLB and the 256 entry shared L2 TLB). Up to 4 pending L1 misses can be outstanding—miss data returns out of order (from either the L2 cache or system memory).

The exemplary 16 KB L1 instruction cache 210 is single-ported 4-way associative, with 2 pending misses. The exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, the L2 cache 140 transfers an entire cache line (32 bytes/256 bits) in one cycle with a 7 clock access latency for L1 misses that hit in the L2.

The exemplary 256 KB L2 cache 140 is 8-way associative and 8-way interleaved. The L2 cache 140 supports one L1 (code/data) miss per cycle and one L1 store or L2 fill per cycle provided that the L1 store or the L2 fill is to a different interleave than the L1 (code/data) miss. Portions or all of 2 of the 8 ways may be locked down for use by the graphics controller 120.

For integer register-register operations, the execution pipeline is 11 stages from code fetch to completion: two cache access stages IC1 and IC2, two alignment stages AL1 and AL2, three decode/rename stages DEC0–DEC2, checkpoint issue stage ISS, and reservation stage RS, followed by the execute and result write-back/forward stages EX and WB. For integer register-memory operations, the LDST unit pipeline adds an additional 4 stages between RS and EX: address calculation AC, translation XL, and data cache access and drive back DC and DB. The floating point adder pipeline is 4 stages, and the floating point multiply pipeline is 5 stages.

3. Flow Diagram of Instruction Decoding

Figure 3:
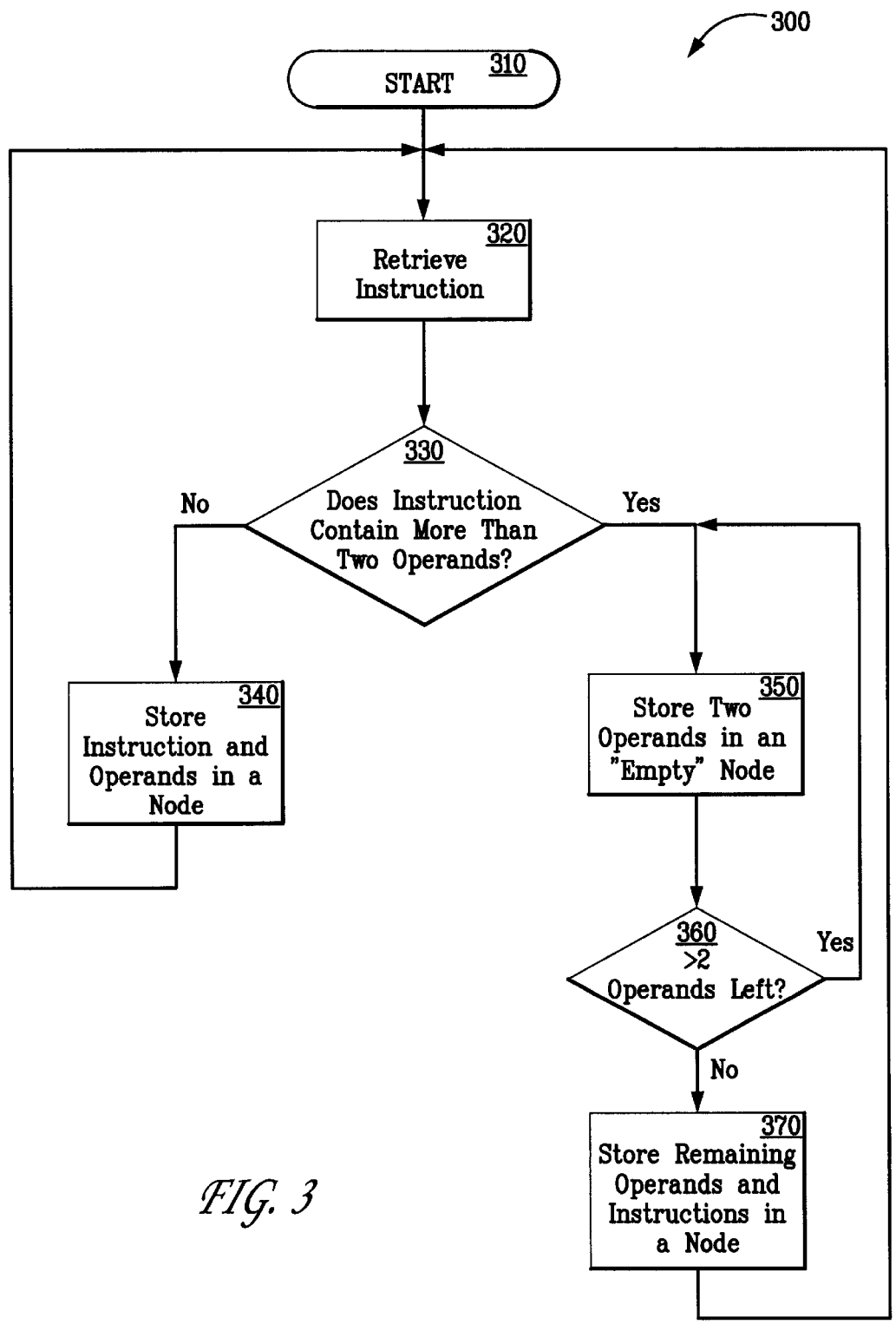
FIG. 3 illustrates a flow diagram of a method of decoding multiple-operand instructions into multiple nodes for processing by the reservation stations.

Turning now to FIG. 3, illustrated is a flow diagram of a method of decoding multiple-operand instructions into multiple nodes for processing by the reservation stations. In FIG. 3, the instruction decode/dispatch logic 200 first performs initialization and starts the multiple-operand instruction decoding in a step 310.

After initialization, the instruction decode/dispatch logic 200 retrieves a x86 instruction to decode in a step 320. Next the instruction decode/dispatch logic 200 determines if the x86 instruction contains more than two operands in a decisional step 330.

If the x86 instruction does not contain more than two operands, the instruction decode/dispatch logic 200 stores the x86 instruction and its associated operands in a single node in a reservation station associated with the appropriate functional unit in a step 340. In one embodiment of the present invention, the functional units comprise the EX, FPU, BR and LDST. The functional unit used is depended upon the type of decoded instruction contained within the node. The instruction decode/dispatch logic 200 then retrieves the next x86 instruction to decode in the step 320.

If the x86 instruction contains more than two operands, the instruction decode/dispatch logic 200 stores two of the x86 instruction's operands in a node that comprises an empty instruction in a reservation station associated with the appropriate functional unit in a step 350. Next, the instruction decode/dispatch logic 200 determines if there are more than two operands remaining for this x86 instruction in a decisional step 360.

If there are more than two operands remaining, the instruction decode/dispatch logic 200 repeats storing two of the x86 instruction's operands in a node in the step 350. If there two or less operands remaining, the instruction decode/dispatch logic 200 stores the x86 instruction's remaining operands and the x86 instruction in a node in a reservation station associated with the appropriate functional unit in a step 370. The instruction decode/dispatch logic 200 then retrieves the next x86 instruction to decode in the step 320.

An example of a x86 instruction that contains more than two operands is the DIV with a 64-bit dividend and a 32-bit divisor. The instruction decode/dispatch logic 200 will store the two operands containing the 64-bit dividend in a node comprising an empty instruction. Next, the instruction decode/dispatch logic 200 will store the single operand containing the 32-bit divisor in a separate node comprising the DIV instruction.

One skilled in the art should know that the present invention is not limited to decoding x86 instructions. Nor is the present invention limited to decoding multiple-operand instructions into only two operand increments. In other embodiments of the present invention, the present invention can decode multiple-operand instructions into as many operand increments as there are available operand buses. Also, the present invention is not limited to reservation stations solely associated with a single functional unit. Other embodiments of the present invention may have additional or fewer steps than described above.

4. Reservation Stations Block Diagram

Figure 4:
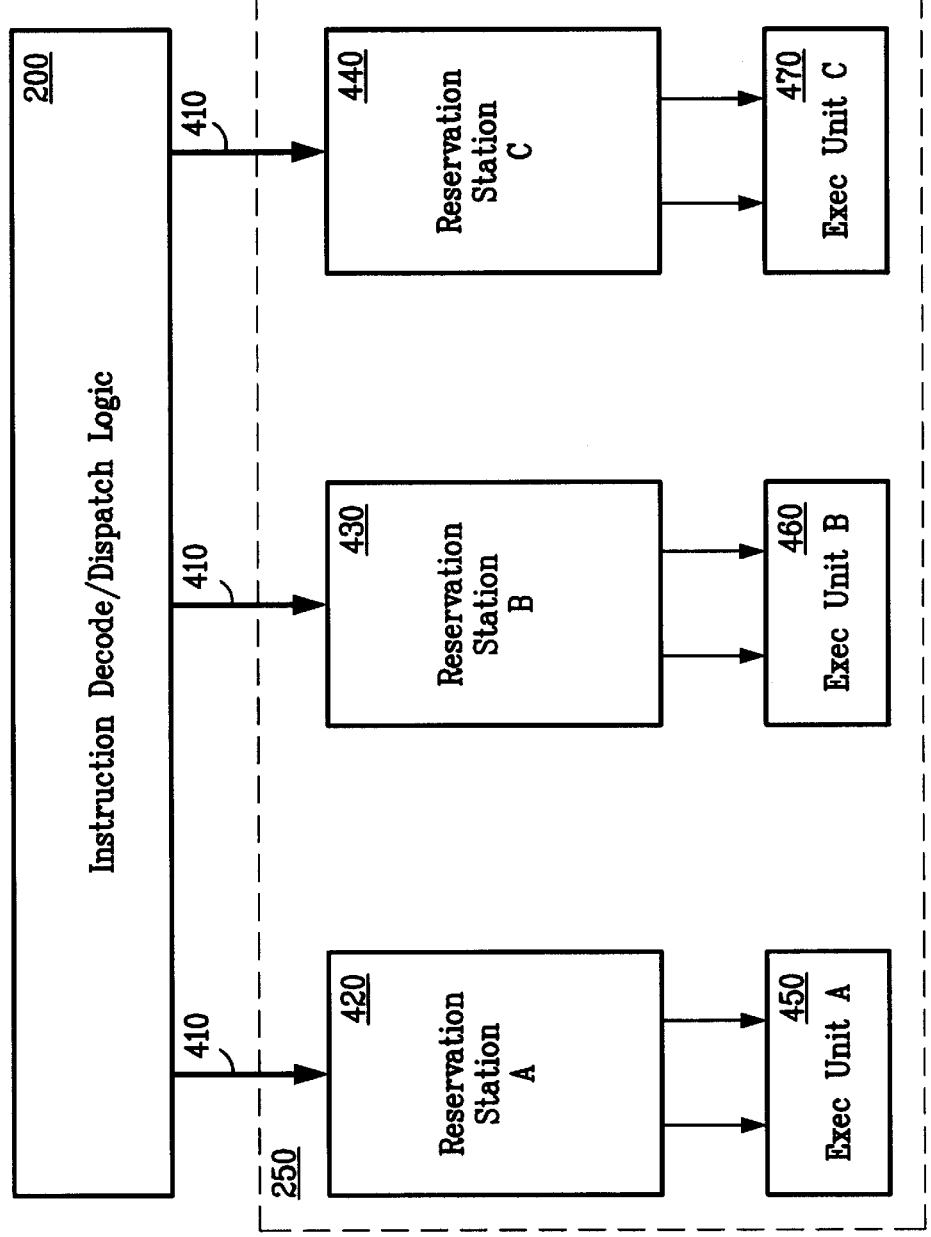
FIG. 4 illustrates a block diagram of the exemplary integrated microprocessor's reservation stations constructed according to the principles of the present invention.

Turning now to FIG. 4, illustrated is a block diagram of the exemplary integrated microprocessor's reservation stations constructed according to the principles of the present invention. In the illustrated embodiment of the present invention, each of the functional units 250 comprise a reservation station A ("RSA") 420, an exec unit A ("EUA") 450, a reservation station B ("RSB") 430, an exec unit B ("EUB") 460, a reservation station C ("RSC") 440, and an exec unit C ("EUC") 470. Other embodiments of the present invention may comprise additional or fewer reservation stations and/or exec units.

The instruction decode/dispatch logic 200 is coupled to the instruction pipelines 410. The instruction pipelines 410 are coupled to RSA 420, RSB 430 and RSC 440. EUA 450 is coupled to RSA 420 and processes RSA's nodes. EUB 460 is coupled to RSB 430 and processes RSB's nodes. EUC 470 is coupled to RSC 440 and processes RSC's nodes. In another embodiment of the present invention, a single reservation station may be coupled to two or more execution units. Each of the execution units performs the appropriate functions according to the type of functional unit it is. In one embodiment of the present invention, the functional units comprise the EX, FPU, BR and LDST.

In one embodiment of the present invention, RSA 420, RSB 430 and RSC 440 are capable of accommodating multiple-operand instructions that have more operands then the number of operand buses available. In the illustrated embodiment, RSA 420, RSB 430 and RSC 440 comprise two operand buses coupled to EUA 450, EUB 460 and EUC 470 respectively. RSA 420, RSB 430 and RSC 440 also comprise node transmission circuitry that transmits the multiple-operand instructions to EUA 450, EUB 460 and EUC 470 respectively.

In one embodiment of the present invention, the instruction decode/dispatch logic 200 decodes and stores a multiple-operand instruction into two nodes of a reservation station. The reservation station schedules the multiple-operand nodes to execute. At the appropriate time, the reservation station's node transmission circuitry transmits both multiple-operand nodes to an execution unit one at a time. When the execution unit receives both nodes, the execution unit executes the multiple-operand instruction.

For example, there is a DIV instruction with three operands. When the instruction decode/dispatch logic 200 decodes the DIV instruction, the instruction decode/dispatch logic 200 stores the DIV instruction into two nodes in RSA 420. The first node contains an empty instruction and the first two operands. The second node contains the DIV instruction and the remaining third operand. RSA 420 schedules both nodes to be executed by EUA 450.

RSA's node transmission circuitry transmits the node comprising the empty instruction and the two operands to EUA 450. EUA 450 examines the empty instruction and retains the two operands for later processing. When RSA's node transmission circuitry transmits the node comprising the DIV instruction and the third operand, the EUA 450 executes the DIV instruction using the two previously stored operands and the new third operand.

The advantage of the present invention is the capability of processing instructions containing more operands than the number of operand buses available. Since multiple-operand instructions are less frequent, the present invention saves valuable processor real estate while only incurring minimal cost in the execution time of the multiple-operand instructions.

One skilled in the art should note that the above description is not limited to reservation station A and execution unit A and applies to all reservation stations and execution units. Also, the present invention is not limited to the processing of multiple-operand instructions containing only three operands. In other embodiments of the present invention, the present invention can process multiple-operand instructions comprising more than three operands.

Also, one skilled in the art should note that no absolute order of transmission of nodes to the execution units is intended or implied. In one embodiment of the present invention, the order of transmission of the empty node and the node containing the actual instruction can be reversed. In a second embodiment of the present invention, the reservation stations may comprise multiple execution units. In this second embodiment, the reservation stations can transmit nodes to other execution units before transmitting all of the multiple-operand nodes. Also, other embodiments of the present invention may have more or less steps or procedures than described.

From the above, it is apparent that the present invention provides, for use in a processor having a pipeline of insufficient width to convey all operands of a given multiple-operand instruction concurrently, a system for, and method of, processing the multiple-operand instruction. In one embodiment, the system includes: (1) node creation circuitry that creates at least first and second nodes for the multiple-operand instruction, the first node being empty and containing at least one of the operands and (2) node transmission circuitry, coupled to the node creation circuitry, that transmits the first and second nodes sequentially through the pipeline. All the operands are subsequently concurrently available within an execution stage of the pipeline for execution of the multiple-operand instruction.

Although the present invention and its advantages have been described in detail, those skilled in the art should understand that they can make various changes, substitutions and alterations herein without departing from the spirit and scope of the invention in its broadest form.

What is claimed is:

1. For use in a processor having a pipeline of insufficient width to convey all operands of a given multiple-operand instruction concurrently, a system for processing said multiple-operand instruction, comprising:

node creation circuitry that creates at least first and second nodes for said multiple-operand instruction, said first node being empty of said multiple-operand instruction and containing at least one of said operands, and said second node containing the multiple-operand instruction and at least another one of said operands; and node transmission circuitry, coupled to said node creation circuitry, that transmits said first and second nodes sequentially through said pipeline, said all operands in said first and second nodes being subsequently concurrently available within an execution stage of said pipeline for execution of said multiple-operand instruction.

2. The system as recited in claim 1 wherein said pipeline has a width sufficient to convey two operands.

3. The system as recited in claim 1 wherein said multiple-operand instruction is a three-operand instruction.

4. The system as recited in claim 1 wherein said node transmission circuitry is contained within a reservation station associated with said pipeline.

5. The system as recited in claim 1 wherein said node transmission circuitry transmits said first node before said second node.

6. For use in a processor having a pipeline of insufficient width to convey all operands of a given multiple-operand instruction concurrently, a system for processing said multiple-operand instruction, comprising:

means for creating at least first and second nodes for said multiple-operand instruction, said first node being empty of said multiple-operand instruction and containing at least one of said operands, and said second node containing the multiple-operand instruction and at least another one of said operands; and means, coupled to said means for creating, for transmitting said first and second nodes sequentially through said pipeline, said all operands in said first and second nodes being subsequently concurrently available within an execution stage of said pipeline for execution of said multiple-operand instruction.

7. The system as recited in claim 6 wherein said pipeline has a width sufficient to convey two operands.

8. The system as recited in claim 6 wherein said multiple-operand instruction is a three-operand instruction.

9. The system as recited in claim 6 wherein said means for transmitting is contained within a reservation station associated with said pipeline.

10. The system as recited in claim 6 wherein said means for transmitting transmits said first node before said second node.

11. For use in a processor having a pipeline of insufficient width to convey all operands of a given multiple-operand instruction concurrently, a method of processing said multiple-operand instruction, comprising the steps of:

creating at least first and second nodes for said multiple-operand instruction, said first node being empty of said multiple-operand instruction and containing at least one of said operands, and said second node containing the multiple-operand instruction and at least another one of said operands; and transmitting said first and second nodes sequentially through said pipeline, said all operands in the first and second nodes being subsequently concurrently available within an execution stage of said pipeline for execution of said multiple-operand instruction.

12. The method as recited in claim 11 wherein said pipeline has a width sufficient to convey two operands.

13. The method as recited in claim 11 wherein said multiple-operand instruction is a three-operand instruction.

14. The method as recited in claim 11 wherein said transmitting is carried out within a reservation station associated with said pipeline.

15. The method as recited in claim 11 wherein said transmitting comprises transmitting said first node before said second node.

16. A computer system, comprising:

(a) a processor having an integer execution core containing at least two execution pipelines for executing instructions and of insufficient width to convey all operands of a given multiple-operand instruction concurrently, said processor capable of addressing segments of system memory coupled thereto;

(b) system memory for storing instructions;

(c) said processor including decode units for decoding an ordered stream of instructions fetched from said system memory; and (d) a system for processing said multiple-operand instruction, including:

(i) node creation circuitry that creates at least first and second nodes for said multiple-operand instruction, said first node being empty of said multiple-operand instruction and containing at least one of said operands, and said second node containing the multiple-operand instruction and at least another one of said operands, and (ii) node transmission circuitry, coupled to said node creation circuitry, that transmits said first and second nodes sequentially through said pipeline, said all operands in the first and second nodes being subsequently concurrently available within an execution stage of said pipeline for execution of said multiple-operand instruction.

17. The computer system as recited in claim 16 wherein said pipeline has a width sufficient to convey two operands.

18. The computer system as recited in claim 16 wherein said multiple-operand instruction is a three-operand instruction.

19. The computer system as recited in claim 16 wherein said node transmission circuitry is contained within a reservation station associated with said pipeline.

20. The computer system as recited in claim 16 wherein said node transmission circuitry transmits said first node before said second node.

* * * * *